US012061899B2

(12) United States Patent
Bunciak et al.

(10) Patent No.: US 12,061,899 B2
(45) Date of Patent: Aug. 13, 2024

(54) INFRASTRUCTURE AS CODE (IaC) PRE-DEPLOYMENT ANALYSIS VIA A MACHINE-LEARNING MODEL

(71) Applicant: Red Hat, Inc., Raleigh, NC (US)

(72) Inventors: Stefan Bunciak, Brno (CZ); Miroslav Jaros, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 149 days.

(21) Appl. No.: 17/513,844

(22) Filed: Oct. 28, 2021

(65) Prior Publication Data

US 2023/0132560 A1   May 4, 2023

(51) Int. Cl.
*G06F 8/71* (2018.01)
*G06F 8/60* (2018.01)
*G06N 20/00* (2019.01)

(52) U.S. Cl.
CPC .................. *G06F 8/71* (2013.01); *G06F 8/60* (2013.01); *G06N 20/00* (2019.01)

(58) Field of Classification Search
CPC .............. G06F 8/60; G06F 8/71; G06N 20/00
See application file for complete search history.

(56) References Cited

U.S. PATENT DOCUMENTS

| | | | | |
|---|---|---|---|---|
| 8,281,985 B1 * | 10/2012 | Steinmetz | .......... | G06Q 20/1085 235/379 |
| 9,183,123 B2 | 11/2015 | Spektor et al. | | |
| 9,256,424 B1 * | 2/2016 | Kuchibhotla | ............. | G06F 8/71 |
| 9,819,547 B2 * | 11/2017 | Maini | ...................... | H04L 47/41 |
| 10,133,865 B1 * | 11/2018 | Feinman | ................. | G06F 21/56 |
| 10,275,285 B1 * | 4/2019 | Gold | ......................... | G06N 3/08 |
| 10,459,695 B2 * | 10/2019 | Hauser | .................. | G06F 11/362 |
| 10,901,876 B2 | 1/2021 | Herrin et al. | | |
| 10,963,242 B2 | 3/2021 | Thomas, Jr. et al. | | |
| 10,996,937 B2 * | 5/2021 | Langton | ................. | G06N 5/048 |

(Continued)

OTHER PUBLICATIONS

Richardson, A., "GitOps Part 4—Application Delivery Compliance and Secure CICD," weaveworks, Feb. 22, 2018, https://www.weave.works/blog/gitops-compliance-and-secure-cicd, 9 pages.

(Continued)

*Primary Examiner* — Douglas M Slachta
(74) *Attorney, Agent, or Firm* — Dority & Manning, P.A.

(57) ABSTRACT

Deployment code that identifies a desired deployment of a computer application onto a computing system comprising one or more compute instances is accessed. The computer application includes a plurality of computing components to be deployed on the one or more compute instances in accordance with the deployment code. Contents of the deployment code are input into a machine learning model (MLM) that has been trained using: a plurality of previously generated deployment codes that identified corresponding desired deployments of corresponding computer applications, and information that identifies successes or failures associated with attempted deployments of the previously generated deployment codes. An output is received from the MLM. Based on the output from the MLM, information indicative of a likelihood of success of deploying the deployment code is sent to a destination.

20 Claims, 6 Drawing Sheets

(56) References Cited

U.S. PATENT DOCUMENTS

| | | | |
|---|---|---|---|
| 11,768,636 B2* | 9/2023 | Gold | G06F 3/0649 |
| | | | 709/203 |
| 2008/0320466 A1* | 12/2008 | Dias | G06F 8/61 |
| | | | 717/176 |
| 2010/0131084 A1* | 5/2010 | Van Camp | G06F 8/65 |
| | | | 700/86 |
| 2011/0145789 A1* | 6/2011 | Rasch | G06F 9/44505 |
| | | | 717/121 |
| 2015/0007065 A1* | 1/2015 | Krishnamoorthy | G06F 3/0483 |
| | | | 715/760 |
| 2015/0112829 A1* | 4/2015 | Jaroker | H04L 67/34 |
| | | | 705/26.5 |
| 2016/0246838 A1* | 8/2016 | Li | G06F 11/3676 |
| 2017/0212829 A1 | 7/2017 | Bales et al. | |
| 2017/0371626 A1* | 12/2017 | Abebe | G06Q 10/06313 |
| 2018/0095739 A1* | 4/2018 | Baset | G06F 8/71 |
| 2018/0293462 A1* | 10/2018 | Ambati | G06F 16/86 |
| 2019/0026091 A1* | 1/2019 | Gao | G06F 9/45533 |
| 2019/0108001 A1* | 4/2019 | Hauser | G06F 11/3668 |
| 2019/0138288 A1* | 5/2019 | Brealey | G06F 11/3688 |
| 2019/0213099 A1* | 7/2019 | Schmidt | G06N 3/044 |
| 2020/0019393 A1* | 1/2020 | Vichare | G06N 20/00 |
| 2020/0033858 A1* | 1/2020 | Xiao | B60W 10/06 |
| 2020/0110619 A1 | 4/2020 | Rajaram et al. | |
| 2020/0218623 A1 | 7/2020 | Zhang et al. | |
| 2020/0372386 A1* | 11/2020 | Kotolyan | G06F 3/0482 |
| 2021/0089432 A1 | 3/2021 | Sharma et al. | |
| 2021/0089860 A1* | 3/2021 | Heere | G06N 20/00 |
| 2021/0117827 A1* | 4/2021 | Wu | G06N 3/08 |
| 2021/0357835 A1* | 11/2021 | Modi | G06F 40/194 |
| 2022/0129337 A1* | 4/2022 | Hermanns | G06N 20/00 |
| 2023/0097733 A1* | 3/2023 | Nelson | G06F 8/71 |
| | | | 726/25 |

OTHER PUBLICATIONS

Zdarsky, F. et al., "Boosting manufacturing efficiency and product quality with AI/ML, edge computing and Kubernetes," Red Hat, Aug. 12, 2020, 10 pages.

* cited by examiner

INFRASTRUCTURE AS CODE (IaC) PRE-DEPLOYMENT ANALYSIS VIA A MACHINE-LEARNING MODEL

BACKGROUND

Infrastructure as code (IaC) is an increasingly popular deployment mechanism for deploying computer applications across computing systems. IaC facilitates automation of complex computer application deployments. A desired state of a computer application is typically identified in one or more files (i.e., "deployment code"). An automation engine then implements the desired deployment on a computing system.

SUMMARY

The examples disclosed herein implement infrastructure as code (IaC) pre-deployment analysis via a machine-learning model to eliminate or greatly reduce deployment issues in deployment code.

In one example a method is provided. The method includes accessing, by a computing device comprising a processor device, deployment code that identifies a desired deployment of a computer application onto a computing system comprising one or more compute instances, the computer application includes a plurality of computing components to be deployed on the one or more compute instances in accordance with the deployment code. The method further includes inputting contents of the deployment code into a machine learning model (MLM) that has been trained using: a plurality of previously generated deployment codes that identified corresponding desired deployments of corresponding computer applications, and information that identifies successes or failures associated with attempted deployments of the previously generated deployment codes. The method further includes receiving an output from the MLM. The method further includes, based on the output from the MLM, sending, to a destination, information indicative of a likelihood of success of deploying the deployment code.

In another example, a computing device provided. The compute instance includes a memory and a processor device coupled to the memory to access deployment code that identifies a desired deployment of a computer application onto a computing system including one or more compute instances, the computer application comprising a plurality of computing components to be deployed on the one or more compute instances in accordance with the deployment code. The processor device is further to input contents of the deployment code into a machine learning model (MLM) that has been trained using: a plurality of previously generated deployment codes that identified corresponding desired deployments of corresponding computer applications, and information that identifies successes or failures associated with attempted deployments of the previously generated deployment codes. The processor device is further to receive an output from the MLM. The processor device is further to, based on the output from the MLM, send, to a destination, information indicative of a likelihood of success of deploying the deployment code.

In another example, a non-transitory computer-readable storage medium is provided. The non-transitory computer-readable storage medium includes executable instructions to cause a processor device to access deployment code that identifies a desired deployment of a computer application onto a computing system comprising one or more compute instances, the computer application comprising a plurality of computing components to be deployed on the one or more compute instances in accordance with the deployment code. The instructions further cause the processor device to input contents of the deployment code into a machine learning model (MLM) that has been trained using: a plurality of previously generated deployment codes that identified corresponding desired deployments of corresponding computer applications, and information that identifies successes or failures associated with attempted deployments of the previously generated deployment codes. The instructions further cause the processor device to receive an output from the MLM. The instructions further cause the processor device to, based on the output from the MLM, send, to a destination, information indicative of a likelihood of success of deploying the deployment code.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Infrastructure as code (IaC) is an increasingly popular deployment mechanism for deploying computer applications across computing systems. IaC facilitates automation of complex computer application deployments. A desired state of a computer application is typically identified in one or more files (i.e., "deployment code"). An automation engine then implements the desired deployment on a computing system.

An attempt by an automation engine to implement a deployment identified in deployment code may be successful or unsuccessful. The deployment code may contain any number of inconsistencies, omissions, or other problems, any of which may result in an unsuccessful deployment of the computer application. As an example, a deployment code may identify a plurality of different components that compose a computer application that are to be deployed across certain types of compute instances, but may inadvertently omit a database component that is necessary for the computer application to properly operate. The automation engine may deploy the computer application as designated in the deployment code over a plurality of compute instances of a computing system, but error messages may be generated when a user attempts to utilize the computer application due to the omission of the database component.

As another example, deployment code may identify that a particular component is to run on a particular operating system, such as a Windows® operating system, but in fact, the component can only execute on a different operating system, such as a Linux operating system. Attempts to deploy the component on a Windows® operating system will result in a failure of the component to operate. As yet another example, deployment code may identify that a particular component should be deployed onto a compute instance that has a designated amount of memory. However, the component may need substantially more memory to operate properly, and thus, if deployed on a compute instance that has only the designated amount of memory, the component will not operate properly.

Such inconsistencies, omissions, or other problems in deployment code may cause user dissatisfaction and may take a substantial amount of time to debug and correct due to the complexity of computer applications and the scale of the computing systems across which the computer applications are deployed. They may also result in a substantial cost to a support organization that is called upon to resolve the problem.

The examples disclosed herein implement IaC pre-deployment analysis via a machine-learning model (MLM) to eliminate or greatly reduce deployment problems identified in deployment code. The examples include training an MLM using a plurality of deployment codes, which were previously attempted to be deployed, each of which identifies a corresponding deployment of a computer application across a computing system, and subsequently generated or obtained information associated with corresponding attempts to implement the deployment identified in the deployment codes. The generated or obtained information may include, by way of non-limiting example, logfile information that identifies successes or failures associated with components and/or compute instances involved in the deployment, information generated by automation engines during the deployment of the components on the compute instances, and information generated during execution of the computer application, such as log messages and the like, after the deployment of the computer application.

After the MLM has been trained, a new deployment code, or proposed modifications to an existing deployment code may be analyzed by the MLM, and the MLM outputs information regarding the likelihood of success or problems with the new deployment code, or with the modifications, respectively. The output may indicate that the deployment should be successful, or the output may identify potential problems with the modifications and thereby prevent subsequent problems that would likely occur if an attempt were made to implement the deployment identified in the modified deployment code.

Figure 1:
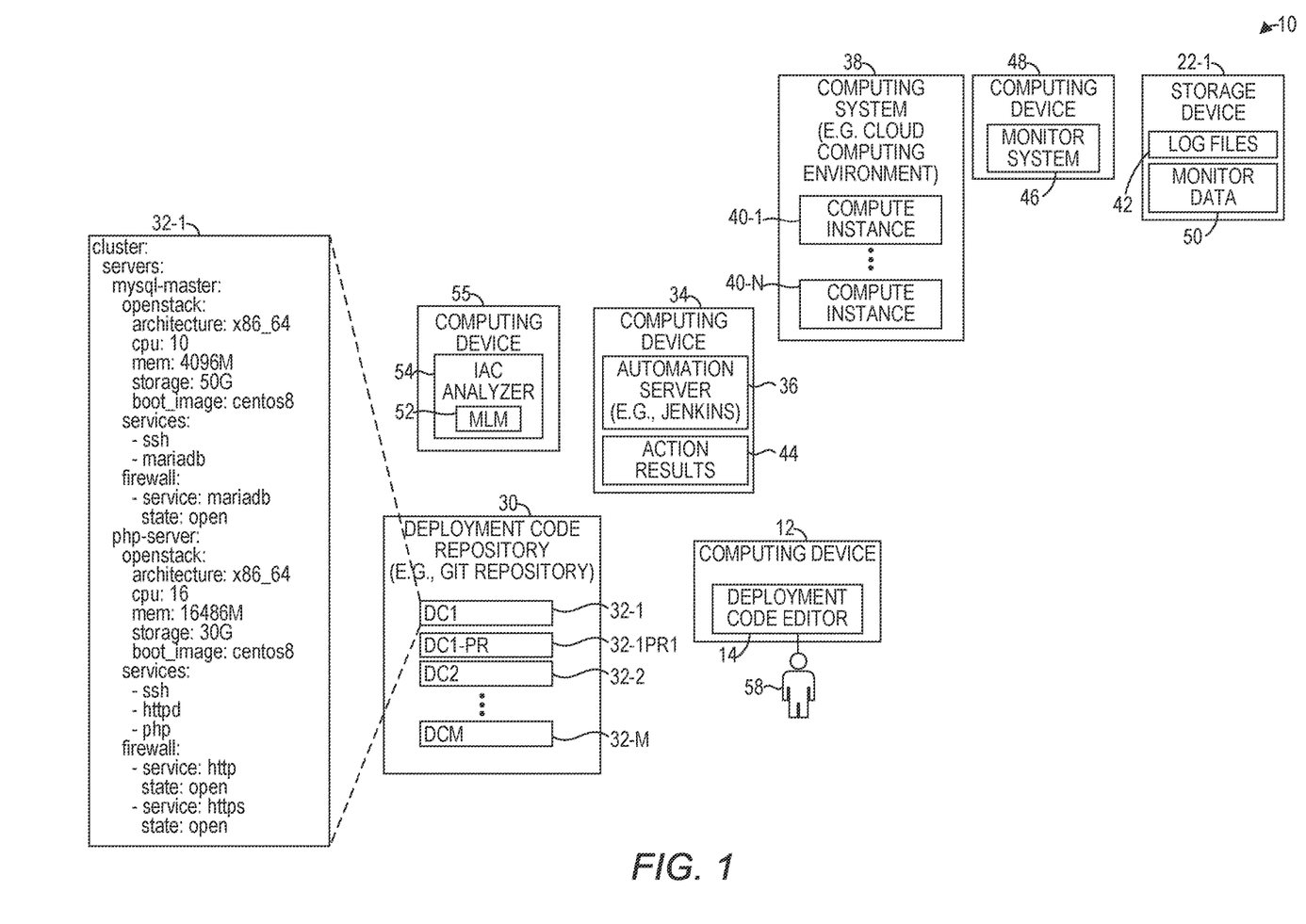
FIG. 1 is a block diagram of an environment suitable for implementing infrastructure as code (IaC) pre-deployment analysis via a machine learning model (MLM) according to one implementation.

FIG. 1 is a block diagram of an environment 10 suitable for implementing IaC pre-deployment analysis via an MLM according to one implementation. The environment 10 includes a computing device 12 on which a deployment code editor 14 executes. While not illustrated for purposes of space and simplicity, all of the computing devices illustrated in the figures include one or more processor devices and a memory.

The environment 10 includes a deployment code repository 30 on which a plurality of deployment codes 32-1, 32-1 PR1, 32-2-32-M (generally, deployment codes 32) are stored. The deployment code repository 30 may be any suitable repository that is capable of storing deployment codes 32, each of which identifies a desired deployment of a computer application onto a computing system comprising one or more compute instances. As used herein, the term "compute instance" refers to a runtime environment, and may comprise a physical machine, sometimes referred to as a bare metal machine, configured to run an operating system, or may comprise a virtual machine (VM) that executes on a physical machine and emulates a physical machine. A VM runs a guest operating system on a physical machine in conjunction with a virtual machine monitor, such as a hypervisor, that is configured to coordinate access to physical resources of the physical machine, such as a memory and a processor device, by the VM(s) running on the physical machine. A compute instance thus, whether a physical machine or a VM, includes a memory and a processor device.

In some implementations, the deployment code repository 30 may be a Git repository, available at git-scm.com and utilize GitOps, a continuous deployment technology for cloud native applications. In some implementations, the deployment codes 32 may be written in a YAML Ain't Markup Language (YAML) syntax. A deployment code 32 can comprise a single file or multiple files that relate to the deployment of the same computer application. A deployment code 32 can identify characteristics of compute instances onto which a component should be deployed. For example, a deployment code 32 can designate that a component be deployed onto a compute instance having one or more of a designated amount of processor cores, a designated amount of storage, a designated amount of memory, or a designated type of operating system. A deployment code 32 may identify any suitable components, such as a database service, or the like.

As an example, the deployment code 32-1 includes deployment information that identifies a deployment of a mysql-server component using an x86_64 architecture (i.e., an Intel 64-bit processor architecture) that has at least 10 processor cores, 4 GB of memory, 50 GB of storage and uses a centos8 boot image. The mysql-server component will use the ssh service and the mariadb service.

The environment 10 includes a computing device 34 on which an automation server 36 executes. The environment 10 also includes a computing system 38 that includes a plurality of compute instances 40-1-40-N (generally, compute instances 40). In some implementations, the computing system 38 may comprise one or more cloud computing environments. The automation server 36 accesses the deployment code 32-1 and deploys the identified components, such as the mysql-master component and the php-server component, on the plurality of compute instances 40 of the computing system 38 in accordance with the deployment code 32-1.

For example, the automation server 36 will identify a compute instance 40 that has an x86_64 architecture, that has at least 10 processor cores, 4 GB of memory, and 50 GB of storage and install, or cause the installation of, the mysql-master component on the compute instance 40. The automation server 36 may be any suitable automation server capable of causing the installation of components on a computing system. In some implementations, the automation server 36 may be, the Jenkins X automation server available at jenkins-x.io. The Jenkins X automation server includes the GitOps deployment technology, although the new GitOps deployment technology may be utilized with other automation servers.

As the automation server 36 deploys the computer application defined in the deployment code 32-1 onto the computing system 38, the compute instances 40 onto which the components are being deployed may generate log messages which may be stored in log files 42 on a storage device 22-1. For example, the initiation of the components may result in the operating system or other components of the compute instance 40 generating log messages that indicate success statuses, warnings, or failure statuses. The automation server 36 may also monitor the initiation of the components onto the compute instances 40 and generate action results 44 associated with the attempted deployment of computing components onto the compute instances 40. The action results 44 may similarly contain information indicating that a component was successfully deployed, or had an issue that caused a warning, or was not properly deployed.

Subsequent to deployment of the computer application defined in the deployment code 32-1, a monitor system 46 executing on a computing device 48 may monitor the components of the computer application. The monitor system 46 may generate monitor data 50 that includes information such as creation events (e.g., new network interfaces, new virtual machines, new physical machines, new rules in existing systems, domain name system records, firewall rules), modification of any of the above, deletion of any of the above, errors from deployed applications such as, by way of non-limiting example, errors from hypertext transfer protocol (http) servers, database servers, orchestration servers, worker machines and the like. The monitor data 50 may also include error states of cloud computing environments.

Over time, the automation server 36 may attempt to deploy the deployment codes 32 multiple times, including new versions of the deployment codes 32. For each such deployment, the automation server 36 may generate corresponding action results 44; the compute instances 40 may generate corresponding log files 42 associated with the attempted deployment, and the monitor system 46 may generate monitor data 50 that corresponds to the deployment. As will be described in greater detail below, the deployment codes 32, the corresponding action results 44, the log files 42, and the monitor data 50 may be used to generate an MLM 52 that operates to identify whether a deployment code 32 contains a problem.

In one example, an IaC analyzer 54 executing on a computing device 55 may, prior to an attempt by the automation server 36 to deploy a deployment code 32, input a deployment code 32 into the MLM 52 for analysis. The IaC analyzer 54 may then, based on the results of the MLM 52, generate information and send the information to a destination. The information may indicate, for example, that the deployment code 32 has no known problems, or that the deployment code 32 may have problems, or that the deployment code 32 has definitive problems. In some examples, the information may identify a probability that a problem will occur. In some examples, if the probability is below a threshold, such as 5% by way of non-limiting example, the IaC analyzer 54 may automatically allow or cause a subsequent action to occur, such as the merging of a pull request that was analyzed by the MLM 52.

In some implementations, the IaC analyzer 54 may analyze a deployment code 32 automatically in response to some event. For example, the IaC analyzer 54 may monitor the deployment code repository 30 and, upon the creation of a new deployment code 32, automatically analyze the new deployment code 32, including the submission of the new deployment code 32 to the MLM 52. In some implementations, a "pull request" may cause the deployment code 32 to be automatically analyzed. A pull request is a GitHub feature that facilitates proposed changes to an existing deployment code 32 in a controlled manner that permits review and comment prior to the changes being merged into the existing deployment code 32. A pull request may be used, for example, to modify an existing deployment code 32. As an example, a user 58 may utilize the pull request feature to suggest that a modification be made to the deployment code 32. The pull request identifies the proposed modification in a deployment code 32-1 PR1. The deployment code 32-1 PR1 contains proposed changes to the deployment code 32. As an example, the deployment code 32-1 PR1 may identify a change to a computing component to be deployed, a type of compute instance on which to deploy a computing component, a characteristic of a compute instance onto which a computing component is to be deployed, authentication information necessary for access to a computing component, or the like.

The deployment code repository 30 may automatically invoke the IaC analyzer 54 upon the creation of a pull request. The IaC analyzer 54 may then analyze the deployment code 32-1 PR1 by inputting the deployment code 32-1 PR1 to the MLM 52. The MLM 52 may indicate that changes contained in the deployment code 32-1 PR1 will not cause deployment problems or may cause deployment problems. The IaC analyzer 54 may then store information in the deployment code repository 30 indicative of the likelihood of success of implementing the changes contained in the deployment code 32-1 PR1. In some implementations, if the MLM 52 indicates that the deployment code 32-1 PR1 will cause deployment problems, the IaC analyzer 54 may inhibit the deployment code 32-1 PR1 from being merged into the deployment code 32-1. If the MLM 52 indicates that the deployment code 32-1 PR1 will not cause deployment problems, or is unlikely to cause deployment problems, the IaC analyzer 54 may automatically cause or allow the deployment code 32-1 PR1 to be merged into the deployment code 32-1.

It is noted that, because the IaC analyzer 54 is a component of the computing device 55, functionality implemented by the IaC analyzer 54 may be attributed to the computing device 55 generally. Moreover, in examples where the IaC analyzer 54 comprises software instructions that program a processor device to carry out functionality discussed herein, functionality implemented by the IaC analyzer 54 may be attributed herein to such processor device.

Figure 2:
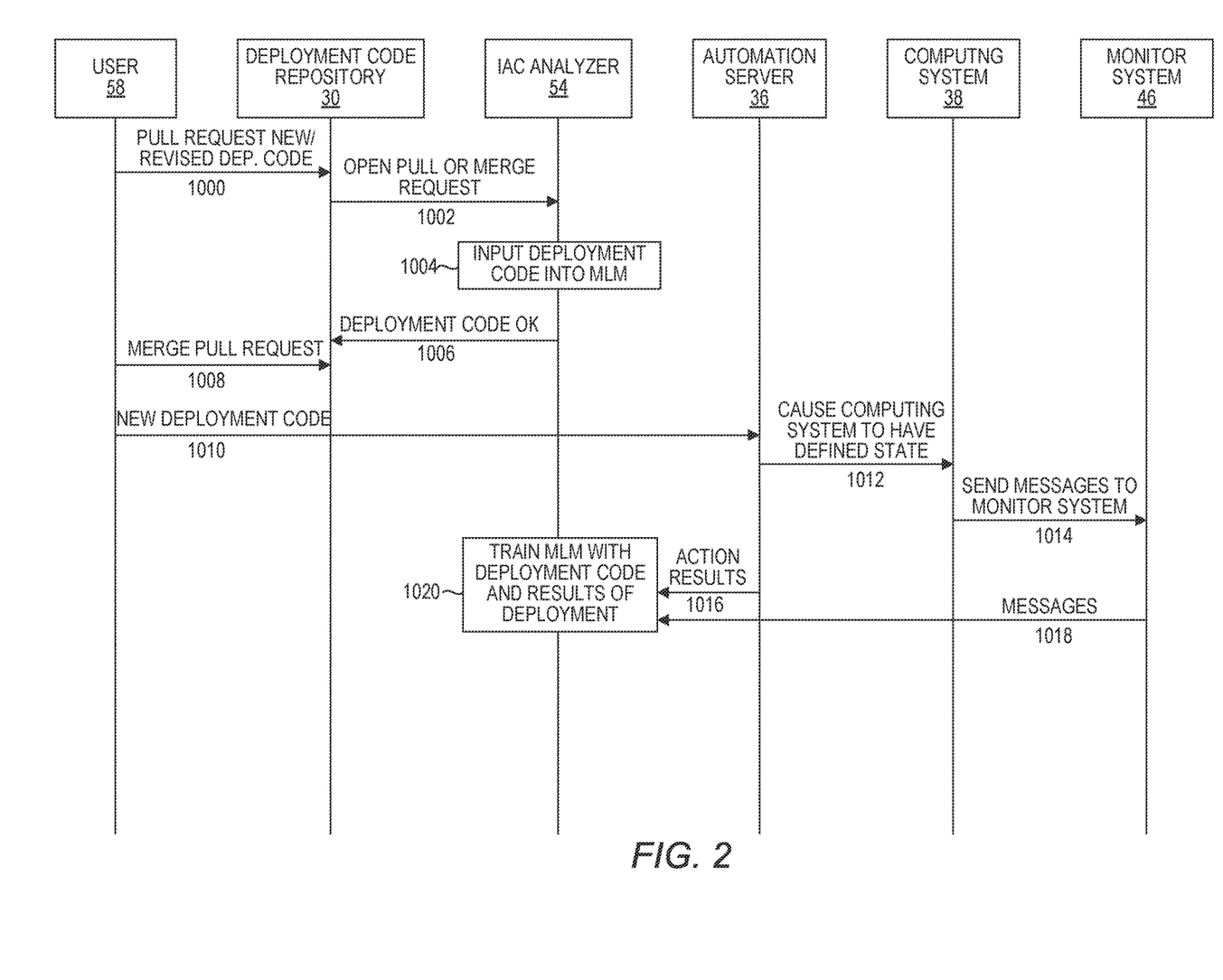
FIG. 2 is a message sequence diagram illustrating example messages communicated between and actions taken by various components illustrated in FIG. 1 according to one implementation.

FIG. 2 is a message sequence diagram illustrating example messages communicated between and actions taken by various components illustrated in FIG. 1 according to one implementation. In this example, the user 58 generates a pull or merge request in the deployment code repository 30 to propose a change to an existing deployment code 32 (step 1000). The deployment code repository 30 informs the IaC analyzer 54 of the pull or merge request (step 1002). The IaC analyzer 54 accesses the deployment code 32-1 PR1 associated with the pull or merge request and inputs the deployment code 32-1 PR1 into the MLM 52 (step 1004). In this example, the MLM 52 outputs information that indicates the deployment code 32-1 PR1 does not contain any errors and is thus likely not to cause any deployment issues. The IaC analyzer 54 stores information in the deployment code repository 30 that indicates that the deployment code 32-1 PR1 is likely to be successfully deployed (step 1006). In the case of a merge request, in some implementations an indication of a likelihood of success of the deployment code 32-1 PR1 may automatically result in the deployment code 32-1 PR1 being merged with the main deployment code 32. In other examples, such as illustrated in FIG. 2, the user 58 may review the information stored by the IAC analyzer 54 in the deployment code repository 30 and merge the deployment code 32-1 PR1 into the main deployment code 32 (step 1008).

The user 58 may send the deployment code 32 to the automation server 36, or the automation server 36 may automatically determine that the deployment code 32 has changed (step 1010). In some implementations, the automation server 36 utilizes a declarative environment wherein the deployment code 32 identifies a desired state of a computer application, and the automation server 36 deploys computer components in accordance with the deployment code 32 to match the desired state (step 1012). The computing system 38 generates events, such as, by way of non-limiting example, log messages that provide information about the components of the computer application deployed in accordance with the deployment code 32. In this example, the log messages are provided to the monitor system 46 (step 1014). The automation server 36 generates action results that provide information about the success or failure of the attempted deployment of the deployment code 32. The MLM 52 may then be additionally trained using the deployment code 32, the action results, and the log messages obtained from the monitor system 46 (steps 1016, 1018, and 1020).

Figure 3:
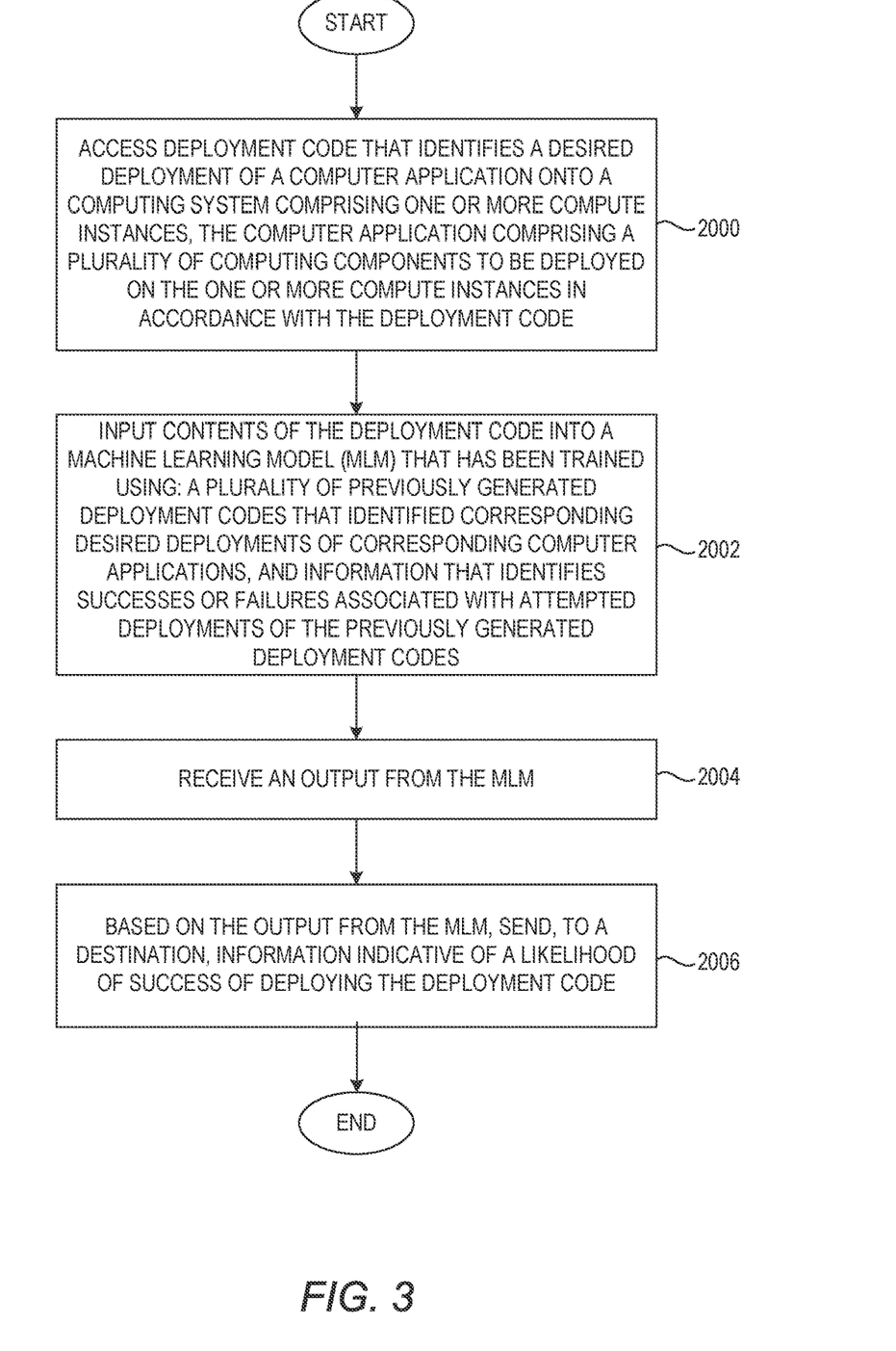
FIG. 3 is a flowchart of a method for IaC pre-deployment analysis via an MLM according to one implementation.

FIG. 3 is a flowchart of a method for IaC pre-deployment analysis via an MLM according to one implementation. FIG. 3 will be discussed in conjunction with FIG. 1. The computing device 55 accesses the deployment code 32-1 PR1 that identifies a desired deployment of a computer application onto the computing system 38 which includes the one or more compute instances 40. The computer application includes a plurality of computing components to be deployed on the one or more compute instances 40 in accordance with the deployment code 32-1 PR1 (FIG. 3, block 2000).

The computing device 55 inputs contents of the deployment code 32-1 PR1 into the MLM 52 that has been trained using a plurality of previously generated deployment codes 32 that identified corresponding desired deployments of corresponding computer applications, and information, such as the action results 44 and the log files 42 that identify successes or failures associated with attempted deployments of the previously generated deployment codes 32 (FIG. 3, block 2002). The computing device 55 receives an output from the MLM 52 (FIG. 3, block 2004). Based on the output from the MLM 52, the computing device 55 sends, to a destination, information indicative of a likelihood of success of deploying the deployment code 32-1 PR1 (FIG. 3, block 2006).

Figure 4:
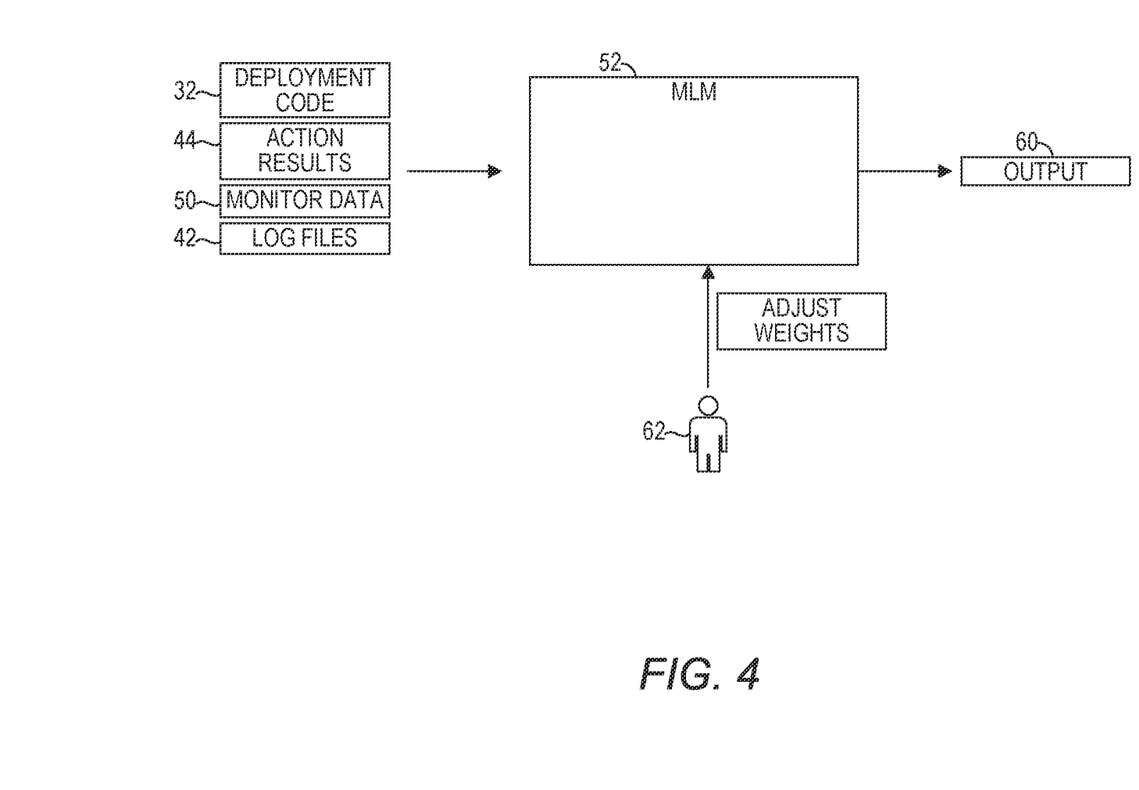
FIG. 4 is a block diagram illustrating a training process for an MLM used in IaC pre-deployment analysis according to one implementation.

FIG. 4 is a block diagram illustrating a training process for an MLM used in IaC pre-deployment analysis according to one implementation. Each attempted deployment of a deployment code 32 by the automation server 36 results in output that can be used, in conjunction with the corresponding deployment code 32, as input to the MLM 52 during training. As an example, in response to attempting to deploy a deployment code 32, the automation server 36 may generate action results 44; the computing system 38 may generate log files 42; and the monitor system may generate monitor data 50. In response to a given algorithm of the MLM 52, the MLM 52 may receive as input the deployment code 32, the action results 44, the log files 42, and the monitor data 50, and generate an output 60. Preliminarily, the input data may go through a transformation process into an intermediate representation to comply with a defined interface of the MLM 52. The input data may include both the expected state of the computer application identified in the deployment code 32, as well as the subsequent actual state of the computer application after the deployment is attempted. Based on the output 60, an operator 62 can alter the MLM 52 algorithm and/or adjust weights associated with the algorithm based on the deployment code 32, the action results 44, the log files 42, and the monitor data 50, until the outputs 60 of the MLM 52 reach a particular accuracy suitable for deployment of the MLM 52.

Figure 5:
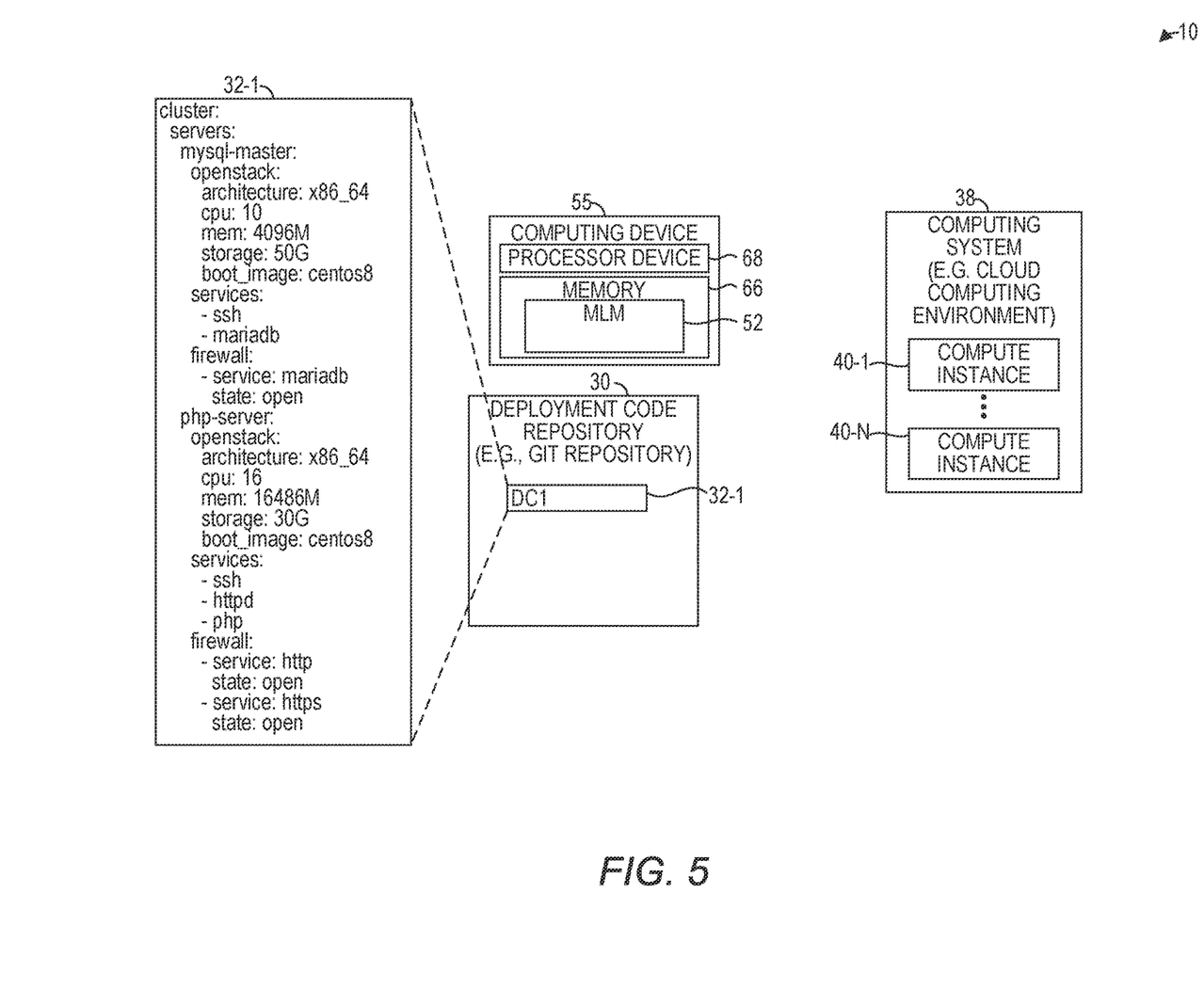
FIG. 5 is a simplified block diagram of the environment illustrated in FIG. 1 according to one implementation.

FIG. 5 is a simplified block diagram of the environment 10 illustrated in FIG. 1 according to one implementation. In this example, the computing device 55 has a memory 66 and a processor device 68 coupled to the memory 66. The processor device 68 is to access the deployment code 32-1 that identifies a desired deployment of a computer application onto the computing system 38 that includes the one or more compute instances 40. The computer application includes a plurality of computing components to be deployed on the one or more compute instances 40 in accordance with the deployment code 32-1. The processor device 68 is further to input contents of the deployment code 32-1 into the MLM 52 that has been trained using: a plurality of previously generated deployment codes 32 that identified corresponding desired deployments of corresponding computer applications, and information that identifies successes or failures associated with attempted deployments of the previously generated deployment codes 32. The processor device 68 is further to receive an output from the MLM 52, and based on the output from the MLM 52, send, to a destination, information indicative of a likelihood of success of deploying the deployment code 32-1.

Figure 6:
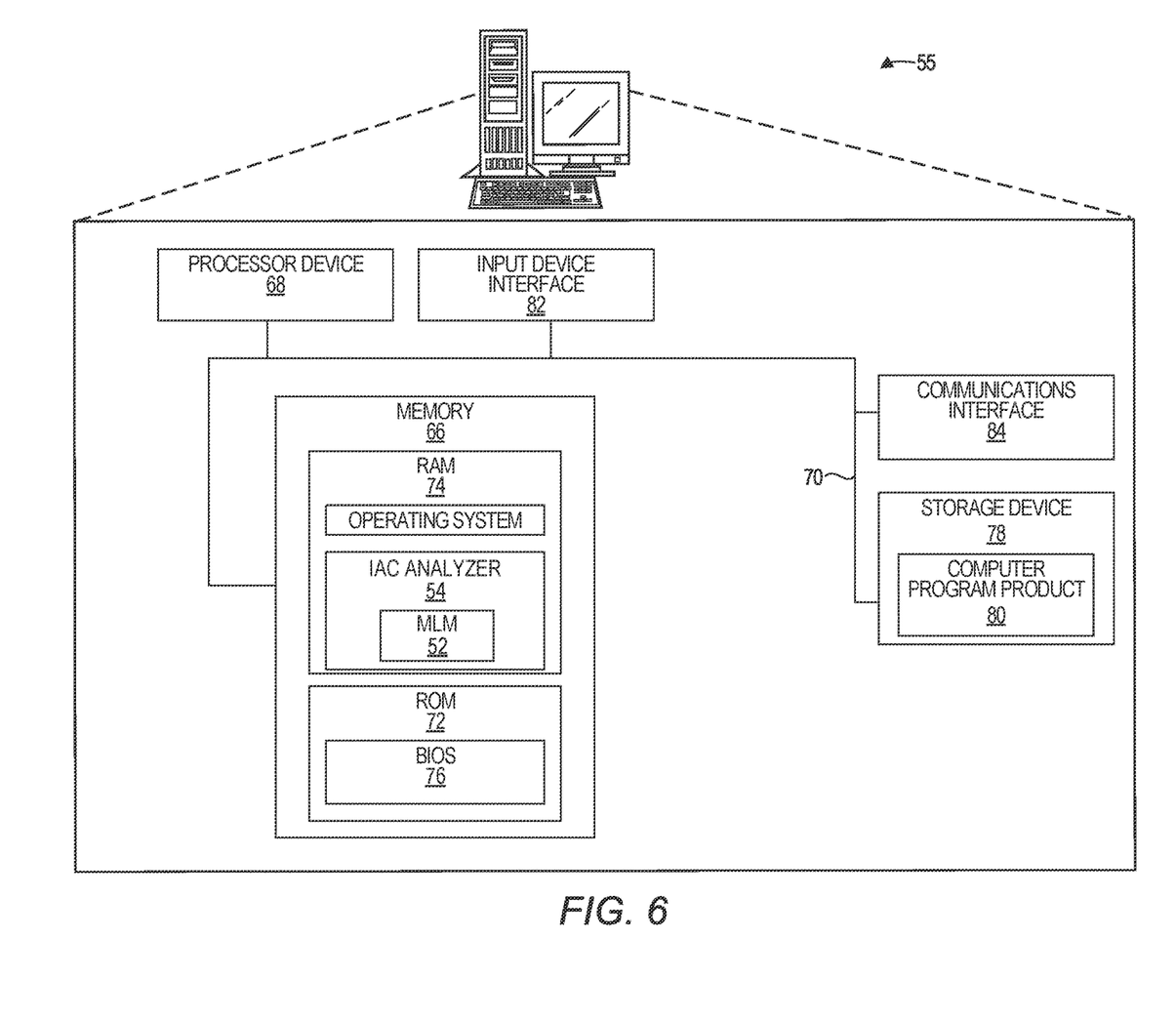
FIG. 6 is a block diagram of a computing device suitable for implementing IaC pre-deployment analysis via an MLM according to one implementation.

FIG. 6 is a block diagram of the computing device 55 illustrated in FIG. 5 according to one implementation. The computing device 55 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 55 includes the processor device 68, the system memory 66, and a system bus 70. The system bus 70 provides an interface for system components including, but not limited to, the system memory 66 and the processor device 68. The processor device 68 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The system memory 66 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 55. The volatile memory 74 may also include a high-speed RAM, such as static RAM, for caching data.

The computing device 55 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like.

A number of modules can be stored in the storage device 78 and in the volatile memory 74, including an operating system and one or more program modules, such as the IaC analyzer 54 and the MLM 52, which may implement the functionality described herein in whole or in part. All or a portion of the examples may be implemented as a computer program product 80 stored on a transitory or non-transitory computer-usable or computer-readable storage medium, such as the storage device 78, which includes complex programming instructions, such as complex computer-readable program code, to cause the processor device 68 to carry out the steps described herein. Thus, the computer-readable program code can comprise software instructions for implementing the functionality of the examples described herein when executed on the processor device 68. The processor device 68, in conjunction with the IaC analyzer 54 in the volatile memory 74, may serve as a controller, or control system, for the computing device 55 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 68 through an input device interface 82 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The computing device 55 may also include a communications interface 84 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a computing device comprising a processor device, deployment code that identifies a desired deployment of a computer application onto a computing system comprising one or more compute instances, the computer application comprising a plurality of computing components to be deployed on the one or more compute instances in accordance with the deployment code;
   generating transformed deployment code by transforming the deployment code based on an interface of a machine learning model (MLM);
   inputting contents of the transformed deployment code into the MLM that has been trained using: a plurality of previously generated deployment codes that identified corresponding desired deployments of corresponding computer applications, and information that identifies successes or failures associated with attempted deployments of the previously generated deployment codes, the information comprising one or more of a log file, monitor data, or a plurality of action results generated by an automation server and associated with the attempted deployments of the previously generated deployment codes;
   receiving an output from the MLM; and
   based on the output from the MLM, sending, to a destination, information indicative of a likelihood of success of deploying the deployment code and a problem with the deployment code.

2. The method of claim 1 wherein the deployment code identifies changes to an existing deployment code.

3. The method of claim 2 wherein the deployment code is generated via a GitOps pull request.

4. The method of claim 1 wherein the deployment code identifies a change to one or more of: a computing component to be deployed, a type of compute instance on which to deploy a computing component, a characteristic of a compute instance onto which a computing component is to be deployed, and authentication information necessary for access to a computing component.

5. The method of claim 1 wherein the deployment code identifies a compute instance having one or more of a designated amount of processor cores, a designated amount of storage, a designated amount of memory, or a designated type of operating system.

6. The method of claim 1 wherein the deployment code identifies a database service to be deployed onto a compute instance.

7. The method of claim 1 wherein the output from the MLM identifies a deployment attribute of the deployment code that has previously caused a deployment error.

8. The method of claim 1 wherein the output from the MLM identifies no errors in the deployment code.

9. The method of claim 1 further comprising:
   detecting, by the computing device, that a deployment code with a modification has been stored on a storage device; and wherein accessing the deployment code further comprises automatically accessing the deployment code in response to detecting that the deployment code with the modification has been stored on the storage device.

10. The method of claim 9 wherein sending, to the destination, the information indicative of the likelihood of success of deploying the deployment code comprises:
  generating a file with the information indicative of the likelihood of success of deploying the deployment code; and
  storing the file on the storage device.

11. The method of claim 1 further comprising, prior to inputting the contents of the transformed deployment code into the MLM:
  obtaining, from an automation server that has attempted to deploy the plurality of previously generated deployment codes, automation server information that identifies a success or failure of attempting to deploy the plurality of previously generated deployment codes;
  obtaining information generated by a plurality of compute instances in response to the attempted deployments of the plurality of previously generated deployment codes; and
  training the MLM with the corresponding plurality of previously generated deployment codes, the corresponding automation service information that identified the success or failure of attempting to deploy the plurality of previously generated deployment codes and the information generated by the plurality of compute instances in response to the attempted deployments of the plurality of previously generated deployment codes.

12. A computing device, comprising:
a memory; and
a processor device coupled to the memory to:
  access deployment code that identifies a desired deployment of a computer application onto a computing system comprising one or more compute instances, the computer application comprising a plurality of computing components to be deployed on the one or more compute instances in accordance with the deployment code;
  generating transformed deployment code by transforming the deployment code based on an interface of a machine learning model (MLM);
  input contents of the transformed deployment code into the MLM that has been trained using: a plurality of previously generated deployment codes that identified corresponding desired deployments of corresponding computer applications, and information that identifies successes or failures associated with attempted deployments of the previously generated deployment codes, the information comprising one or more of a log file, monitor data, or a plurality of action results generated by an automation server and associated with the attempted deployments of the previously generated deployment codes;
  receive an output from the MLM; and
  based on the output from the MLM, send, to a destination, information indicative of a likelihood of success of deploying the deployment code.

13. The computing device of claim 12 wherein the deployment code is generated via a GitOps pull request.

14. The computing device of claim 12 wherein the deployment code identifies a change to one or more of: a computing component to be deployed, a type of compute instance on which to deploy a computing component, a characteristic of a compute instance onto which a computing component is to be deployed, and authentication information necessary for access to a computing component.

15. The computing device of claim 12 wherein the deployment code identifies a compute instance having one or more of a designated amount of processor cores, a designated amount of storage, a designated amount of memory, or a designated type of operating system.

16. The computing device of claim 12 wherein the processor device is further to detect that a deployment code with a modification has been stored on a storage device; and wherein accessing the deployment code further comprises automatically accessing the deployment code in response to detecting that the deployment code with the modification has been stored on the storage device.

17. A non-transitory computer-readable storage medium that includes executable instructions configured to cause a processor device to:
  access deployment code that identifies a desired deployment of a computer application onto a computing system comprising one or more compute instances, the computer application comprising a plurality of computing components to be deployed on the one or more compute instances in accordance with the deployment code;
  generating transformed deployment code by transforming the deployment code based on an interface of a machine learning model (MLM);
  input contents of the transformed deployment code into the MLM that has been trained using: a plurality of previously generated deployment codes that identified corresponding desired deployments of corresponding computer applications, and information that identifies successes or failures associated with attempted deployments of the previously generated deployment codes, the information comprising one or more of a log file, monitor data, or a plurality of action results generated by an automation server and associated with the attempted deployments of the previously generated deployment codes;
  receive an output from the MLM; and
  based on the output from the MLM, send, to a destination, information indicative of a likelihood of success of deploying the deployment code.

18. The non-transitory computer-readable storage medium of claim 17 wherein the deployment code identifies a change to one or more of: a computing component to be deployed, a type of compute instance on which to deploy a computing component, a characteristic of a compute instance onto which a computing component is to be deployed, and authentication information necessary for access to a computing component.

19. The non-transitory computer-readable storage medium of claim 17 wherein the deployment code identifies a compute instance having one or more of a designated amount of processor cores, a designated amount of storage, a designated amount of memory, or a designated type of operating system.

20. The non-transitory computer-readable storage medium of claim 17 wherein the instructions further cause the processor device to detect that a deployment code with a modification has been stored on a storage device; and wherein accessing the deployment code further comprises automatically accessing the deployment code in response to detecting that the deployment code with the modification has been stored on the storage device.

* * * * *